(12) United States Patent
Bulman

(10) Patent No.: US 7,797,943 B2
(45) Date of Patent: Sep. 21, 2010

(54) CORE BURNING FOR SCRAMJET ENGINES

(75) Inventor: Melvin J. Bulman, Orangeville, CA (US)

(73) Assignee: Aerojet-General Corporation, Rancho Cordova, CA (US)

( * ) Notice: Subject to any disclaimer, the term of this patent is extended or adjusted under 35 U.S.C. 154(b) by 1008 days.

(21) Appl. No.: 11/582,589

(22) Filed: Oct. 18, 2006

(65) Prior Publication Data

US 2008/0092519 A1 Apr. 24, 2008

(51) Int. Cl.
*F02K 7/08* (2006.01)
(52) U.S. Cl. .......................... 60/767; 60/768
(58) Field of Classification Search .............. 60/268, 60/267, 749, 750, 204, 779, 39.091, 39.094, 60/587, 583; 220/749, 745–750
See application file for complete search history.

(56) References Cited

U.S. PATENT DOCUMENTS

| | | | |
|---|---|---|---|
| 3,270,506 A | 9/1966 | Bahr | |
| 4,170,110 A * | 10/1979 | Radin | ............... 60/204 |
| 4,930,309 A | 6/1990 | Hartman | |
| 5,220,787 A | 6/1993 | Bulman | |
| 5,253,474 A | 10/1993 | Correa et al. | |
| 5,301,901 A | 4/1994 | Kutschenreuter, Jr. | |
| 5,394,685 A | 3/1995 | Kesten et al. | |
| 5,853,143 A | 12/1998 | Bradley et al. | |
| 6,550,235 B2 * | 4/2003 | Johnson et al. | ............... 60/204 |
| 6,857,261 B2 | 2/2005 | Wilson et al. | |
| 6,907,724 B2 | 6/2005 | Edelman et al. | |
| 6,981,364 B2 | 1/2006 | Okamoto et al. | |
| 7,000,398 B2 | 2/2006 | Bouchez et al. | |
| 7,003,961 B2 | 2/2006 | Kendrick et al. | |

OTHER PUBLICATIONS

Military Specification, *Turbine Fuel Low Volatility*, JP-7, MIL-T-38219B, Mar. 1, 1985.
Internet Publication, *Supersonic Combustion Ramjet Component Research*, by Dr. Mark R. Gruber, http://www.afrlhorizons.com/Briefs/0009/PR0001.html, printed Aug. 17, 2006.

* cited by examiner

*Primary Examiner*—Michael Cuff
*Assistant Examiner*—Vikansha S Dwivedi
(74) *Attorney, Agent, or Firm*—Wiggin and Dana LLP; Gregory S. Rosenblatt

(57) ABSTRACT

A pilot for a scramjet provides a flame front whose arrival at the wall of the scramjet combustor is delayed thereby reducing combustor heat load. By combining in-stream injection of fuel with an interior pilot and a lean (fuel-poor) outer annulus, the bulk of combustion is confined to the scramjet combustor center. This concept, referred to as "core-burning," further reduces combustor heat load. One such pilot is for a two dimensional scramjet effective to propel a vehicle. This pilot includes a plurality of spaced apart struts separated by ducts and a strut pilot contained within each strut. A second such pilot is for an axisymmetric scramjet engine has, in sequence and in fluid communication, an air intake, an open bore scramjet isolator and a scramjet combustor. This centerbody pilot pod includes a pilot isolator disposed between the air intake and a pilot diffuser, the pilot diffuser disposed between the pilot isolator and a pilot with the pilot disposed between the pilot diffuser and a pilot combustor. The pilot pod is in axis symmetry around a central axis of the scramjet isolator and supported by a plurality of struts extending from an inner wall of the open bore to an outer surface of the centerbody pilot pod.

7 Claims, 10 Drawing Sheets

CORE BURNING FOR SCRAMJET ENGINES

CROSS REFERENCE TO RELATED APPLICATION(S)

N.A.

U.S. GOVERNMENT RIGHTS

N.A.

BACKGROUND OF THE INVENTION

1. Field of the Invention

This invention relates to an engine that utilizes air moving at supersonic speeds for compression, combustion and expansion. Such an engine is known as a scramjet. More particularly, a pilot pod is centrally disposed within an isolator of a scramjet module. As a result, the hottest combustion gases are located within the core of the combustor, rather than along the walls, thereby reducing combustor heat load.

2. Description of the Related Art

Engines that use ram compression instead of a mechanical compressor to pressurize air for combustion and expansion are known as ramjets. When the flowpath through the engine is designed specifically for higher speeds where supersonic combustion is superior, that is typically at speeds above Mach 5 or 6, the engine is referred to as a scramjet. A simplified version of a prior art scramjet is illustrated in FIG. 1. The two dimensional scramjet 10 is generally symmetric about axis 12 and includes a main isolator 14 that connects the scramjet intake 16 to a main combustor 18. The main isolator 14 permits raising the air pressure higher than the scramjet intake 16 can generate at a given flight speed and altitude. While not required for a scramjet, the main isolator 14 is vital for dual mode ramjets that are capable of operation in both subsonic and supersonic environments. A suitable fuel 19 is introduced into the airflow through fuel injectors 20. Combustion of the fuel/air mix generates very high temperatures and rapid expansion of gaseous combustion products. Expulsion of these combustion products through a nozzle (not shown) downstream 22 of the main combustor 18 generates thrust.

The high velocity and low pressure flow of air and fuel, within the main combustor 18 makes it difficult to sustain combustion. In most scramjet engines the combustion will only take place when a suitable pilot zone ignites an incoming fuel/air mixture and then propagates across the duct with a turbulent flame front. This flame travels normal to the air at a fraction of the mean air velocity so the flame front appears to be swept back at a large angle. In prior art scramjets, with the pilot 24 situated on the main combustor wall 26 of the scramjet 10 that defines the exterior wall of the main combustor 18, the exterior wall 26 is immediately exposed to full combustion temperature while the flame slowly moves radially inward to burn the rest of the air. Dotted isotherm lines 28 illustrate a demarcation between hottest region 30 (e.g. typical total temperature in excess of 6000° R), moderate region 32 (e.g. typical total temperature between 5000° R and 6000° R), and coolest region 34 (e.g. typical temperature less than 5000° R). The hottest region 30 generates a high combustor heat load on the exterior walls 26 of the main combustor 18 which are exposed to the most severe thermal environment. As a result, the walls must be made from exotic high temperature resistant materials such as tungsten or actively cooled with scarce fuel increasing costs and complexity.

U.S. Pat. No. 4,170,110 to Radin discloses a scramjet where the intake air is divided into a central stream and peripheral boundary layer streams. The peripheral boundary layer streams are very narrow, on the order of 15 microns in thickness. A typical scramjet with a non-axisymmetric, two dimensional (2-D), pilot is illustrated in U.S. Pat. No. 5,253,474 to Correa, et al. Both U.S. Pat. No. 4,170,110 and U.S. Pat. No. 5,253,474 are incorporated by reference herein in their entireties.

There remains a need for a scramjet having a reduced heat load applied to the wall of the combustor as compared to the prior art.

BRIEF SUMMARY OF THE INVENTION

The details of one or more embodiments of the invention are set forth in the accompanying drawings and the description below. Other features, objects and advantages of the invention will be apparent from the description and drawings, and from the claims.

In accordance with a first embodiment of the invention, there is provided a two dimensional scramjet effective to propel a vehicle. This scramjet includes a plurality of spaced apart struts separated by ducts and a strut pilot contained within each strut.

In accordance with a second embodiment of the invention, there is provided a centerbody pilot pod for a scramjet engine. The scramjet engine has, in sequence and in fluid communication, an air intake, an open bore scramjet isolator and a scramjet combustor. The pilot pod includes a pilot isolator disposed between the air intake and a pilot diffuser, the pilot diffuser disposed between the pilot isolator and a pilot with the pilot disposed between the pilot diffuser and a pilot combustor. The pilot pod is in axis symmetry along a central axis of said scramjet isolator and supported by a plurality of struts extending from an inner wall of the open bore to an outer surface of the pilot pod.

It is an advantage of certain aspects of the invention that flame front arrival at the wall of the scramjet combustor is delayed thereby reducing combustor heat load. A further advantage of certain aspects of the invention is that by combining in-stream injection of fuel with a lean (fuel-poor) outer annulus, the bulk of combustion is confined to the scramjet combustor center. This concept, referred to as "core-burning," further reduces combustor heat load.

Among the benefits of the core-burning embodiments of the invention are the scramjet combustor length may be reduced when instream injection is utilized. Further, the fuel injectors may be spaced for zone injection. In-stream injection is recognized as effective to reduce the combustor length relative to wall only injection resulting in reduced viscous losses and heat load within the combustor. Combustor hot spots are minimized or eliminated simplifying cooling requirements and may reduce or eliminate the need for an endothermic heat sink.

BRIEF DESCRIPTION OF THE DRAWINGS

Like reference numbers and designations in the various drawings indicated like elements.

DETAILED DESCRIPTION

Figure 2:
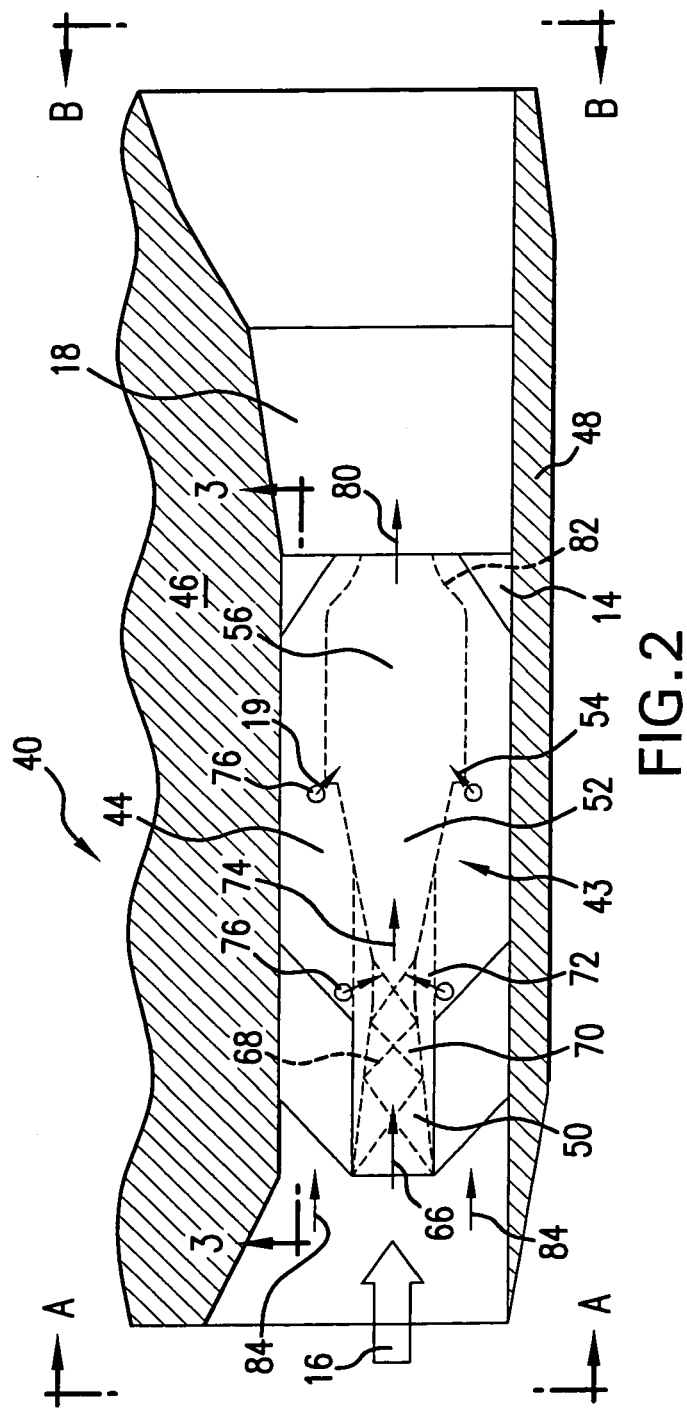
FIG. 2 illustrates a strut pilot installed in a scramjet module in accordance with a first embodiment of the invention.
Figure 3:
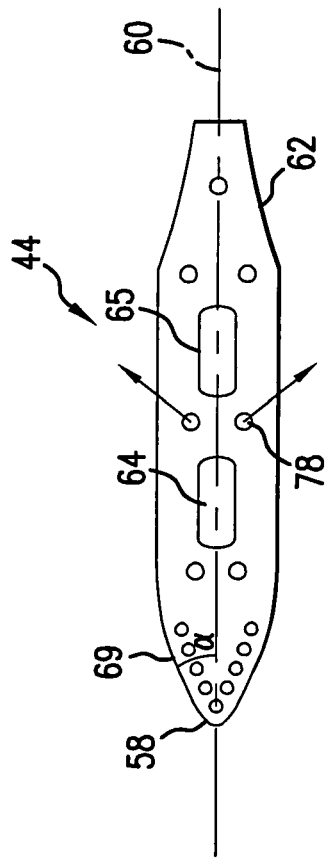
FIG. 3 is a cross-sectional view of a strut used to contain the strut pilot of FIG. 2.

FIG. 2 illustrates a 2-D scramjet module 40 having a strut pilot 43 in accordance with a first embodiment of the invention. The strut pilot 43 is fully contained within strut 44 that bridges a gap within the main isolator 14 extending between a body side 46 of a vehicle, such as a missile or the like and a cowl side 48. The strut 44 mounted strut pilot 43 includes a pilot isolator 50, a pilot diffuser 52, a pilot flameholder 54, a pilot combustor 56 and a pilot nozzle 82. It is noted that the strut pilot 43 is essentially a ramjet fully contained within strut 44. As illustrated in cross-sectional representation in FIG. 3, the strut 44 has a small leading edge radius 58 and a wedge shaped windscreen 69 that forms a relatively small angle, α, relative to a center line axis 60 to minimize air drag through the main isolator of the scramjet module. Trailing edge 62 is formed by a tapered boat tail shape with a similar angle relative to the centerline axis and may have bluff base for enhanced strength. The walls of the strut define a central cavity 64. Among the functions of the central cavities are to house the strut pilot, to provide a channel for the flow of fluids, and to reduce the weight of the strut, including by forming lightening holes 65 to remove metal not need to provide support.

With reference back to FIG. 2, in operation, the strut pilot 43 receives incoming pilot portion air 66 which is slowed in the pilot isolator 50 by a shock train 68 and further slowed in the pilot diffuser 52. On entering the pilot isolator 50, the pilot portion air 66 is at a first supersonic speed (M1) and first pressure (P1). Within the pilot isolator 50, the pilot portion air 66 is divided into a supersonic core 70 and subsonic boundary layer 72. Outgoing 74 pilot portion air enters the pilot diffuser 52 at a second subsonic speed (M2) and second pressure (P2) where M1>M2 and P1<P2. A ratio of the length of the pilot isolator 50 to its width is selected to maximize an increase in air pressure, typically 8:1.

Inwardly directed pilot fuel injectors 76 add fuel 19 to the pilot portion air 66 which is ignited by pilot flameholder 54 and burned in pilot combustor 56. Hot exhaust 80 exits the strut pilot 43 through a choked nozzle 82 to ignite a fuel and air mixture flowing around the strut 44 into the main combustor 18. A suitable fuel injector for both pilot fuel injectors 76 and outwardly directed main fuel injectors 78 is a cascade injector such as that disclosed in U.S. Pat. No. 5,220,787. U.S. Pat. No. 5,220,787 is incorporated by reference in its entirety herein.

A supersonic stream of air from scramjet intake 16 is divided into pilot portion air 66 stream and main air 84 stream. The main air 84 flows around the outside of the strut 44 and through the main isolator 14. The pilot portion air 66 streams through the pilot isolator 50 as described above. Typically, the pilot portion air 66 will constitute from about 3% to 10%, by volume, of the air captured by scramjet intake 16. Fuel injectors 76, 78 introduce a suitable fuel 19 such as JP-7 (a kerosene distillate, low volatility aviation turbine fuel as defined by Military Specification MIL-T-38219B (USAF)) or hydrogen into the pilot portion air 66 and main air 84. The fuel injectors 76, 78 have pilot circuits disposed within the pilot duct and main injectors on the outer surface of the strut 44 as shown in more detail in FIG. 6.

Figure 4:
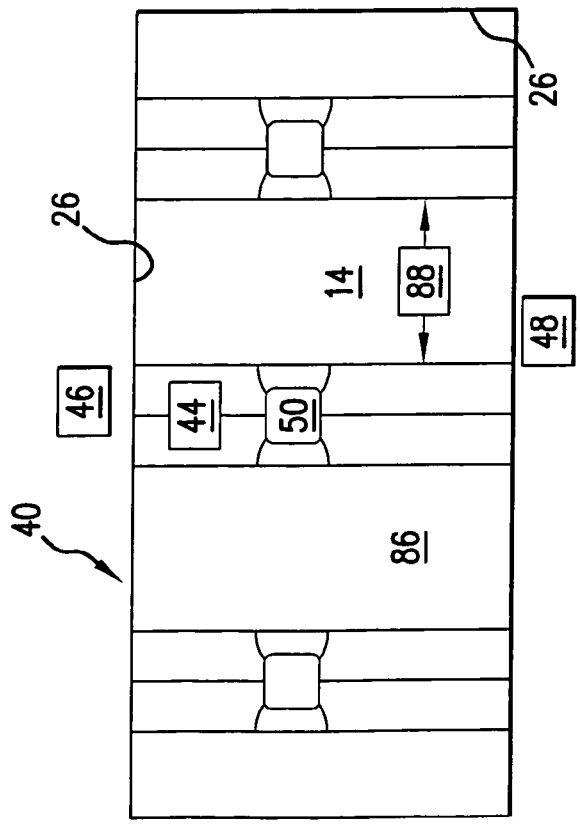
FIG. 4 is a frontal view of the scramjet module of FIG. 2.

FIG. 4 is a frontal view, along sight line A-A of FIG. 2, of a 2-D scramjet module 40 containing three struts 44 and four ducts 86. The struts 44 extend from body side 46 to cowl side 48. The main air flows through the ducts 86 that form the scramjet isolator 14 which is defined by the smallest gap 88 between the struts 44. The struts 44 also have a structural function, carrying load between the body 46 and cowl 48 reducing the effective span of the scramjet module 40. The net flow area of the combination of main isolator 14 and pilot isolator 50 is constant or increasing slightly to insure inlet starting at a suitable low Mach number. The blockage of the struts is minimized consistent with the volume for the pilot function, cooling and structural requirements.

Figure 5:
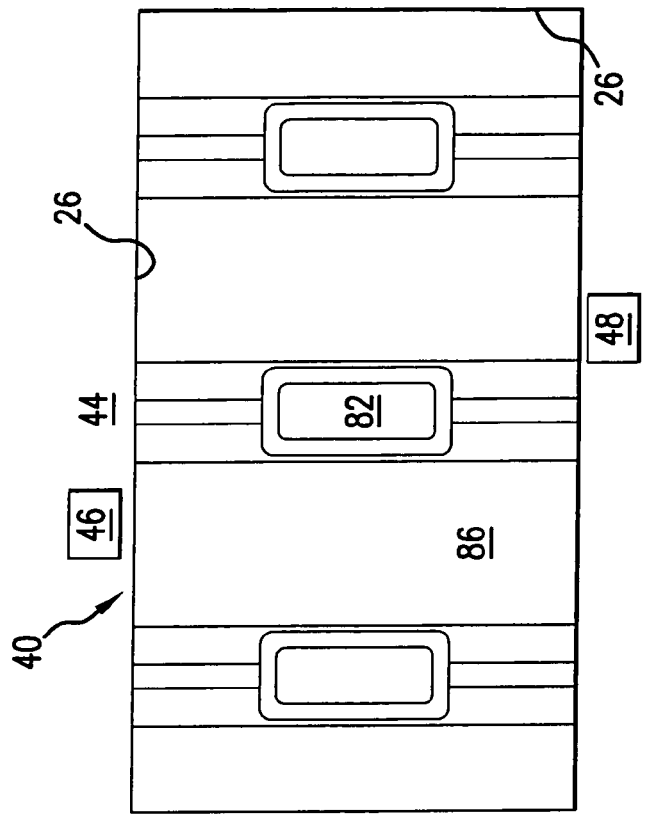
FIG. 5 is a rear view the scramjet module of FIG. 2.

FIG. 5 is a rearview, as viewed along sight line B-B of FIG. 2, illustrating multiple strut pilot exhaust nozzles 82 situated in the interior of the scramjet module. The hot gases from the pilots continuously ignite fresh fuel/air reactants passing between the struts 44. The flame stability is greatly enhanced by first combusting the pilot air and fuel in the pilot combustor (56 of FIG. 2) and then igniting the main air/fuel mixture in ducts 86. The pilot utilizes only a small fraction of the total engine flow (3%-10%, by volume) in order to burn just enough air and fuel to insure the main flow is ignited while maintaining supersonic through flow for the main flow path.

Figure 6:
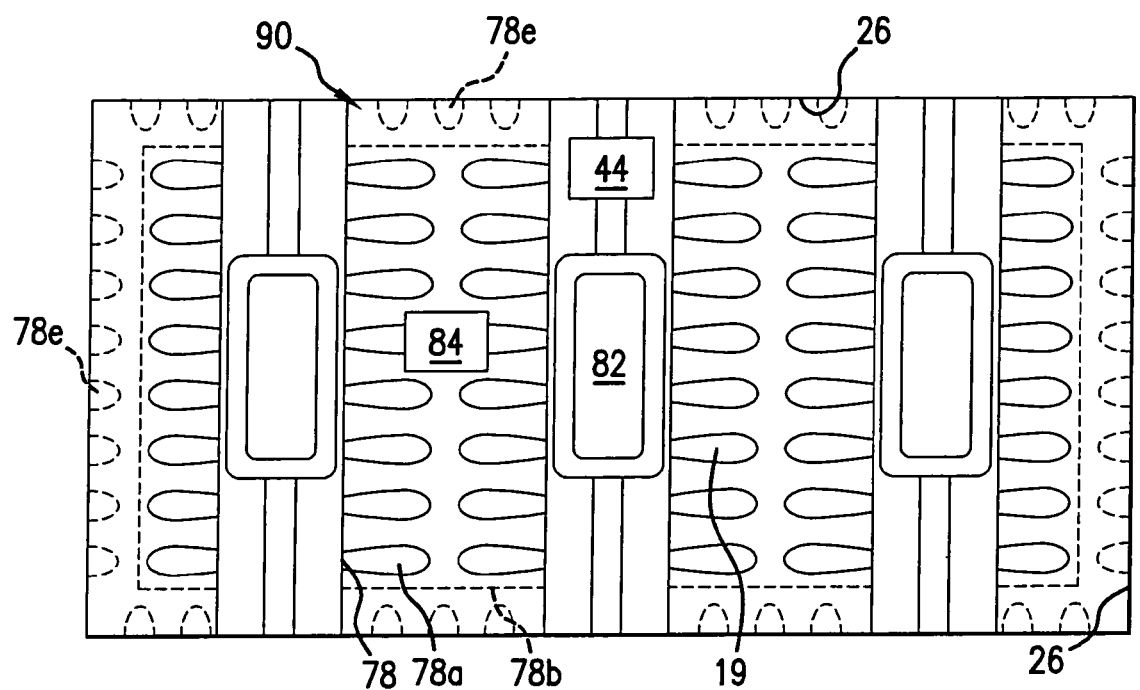
FIG. 6 is a rear view of the scramjet module of FIG. 2 illustrating fuel injection.

FIG. 6 is the same rear view as FIG. 5 showing the main fuel injectors 78 injecting fuel 19 into the main air 84 flowpath. The plumes of fuel 19 may be injected through apertures formed in exterior walls of the struts 44. A zoned fuel injection strategy, as described below, is employed and FIG. 6 illustrates a lean fuel condition where approximately the outermost 20% of the main combustor is unfueled creating a lean region along main combustor walls 26. At cruise speed, those main fuel injectors adjacent a wall of the main isolator are in a no-flow condition while a remainder of the main fuel injectors are in a provide fuel condition. Fuel flow is reduced to a lean condition using only the main fuel injectors 78 which are designed to fuel the interior region of the main air 84 flowpath. The outer region 90 is unfueled at cruise resulting in a lean and cooler wall environment.

Figure 7:
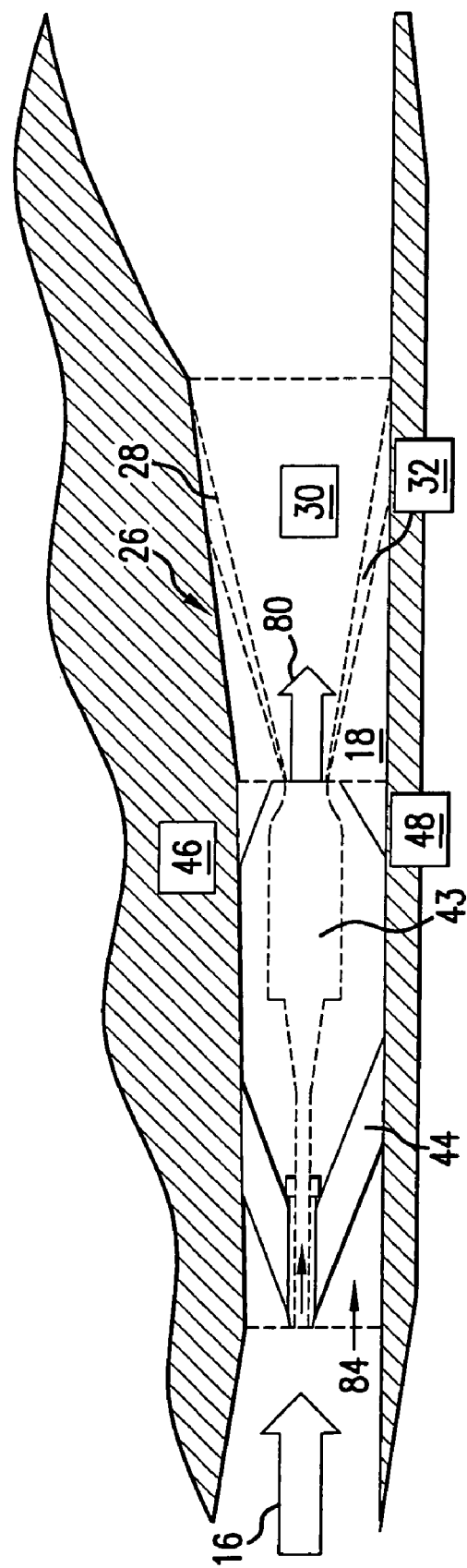
FIG. 7 illustrates a thermal profile for the scramjet module of FIG. 2.

FIG. 7 illustrates an advantage of the strut pilot 43 of this first embodiment of the invention. When the scramjet is in high speed cruise mode, utilizing lean fueling, isotherm lines 28 illustrate how the hottest region 30 is isolated from the main combustor walls 26 reducing combustor thermal loading. Main fuel injectors inject fuel into the main air 84 flowpath that streams around the struts 44. The air/fuel mix is ignited in the scramjet main combustor 18 by the hot gaseous exhaust 80 exiting the pilot. With core burning, the pilot zone and the initiation of the combustion hottest region 30 is remote from the main combustor wall 26. As the flame front travels from the center of the main combustor 18 towards the combustor wall 26, the mixture is rapidly raised in temperature according to the amount of fuel mixed with the air. As the flame front crosses the gap and approaches the combustor wall 26, it encounters the lean region with little or no fuel contained therein. This lean air can not burn, so the combustor wall never sees the full heat flux of prior art scramjets. With a shorter main combustor 18 length due to instream injection from the struts 44 and a lower heat flux, the heat load is significantly lower with core burning than possible with prior art scramjets.

Figure 8:
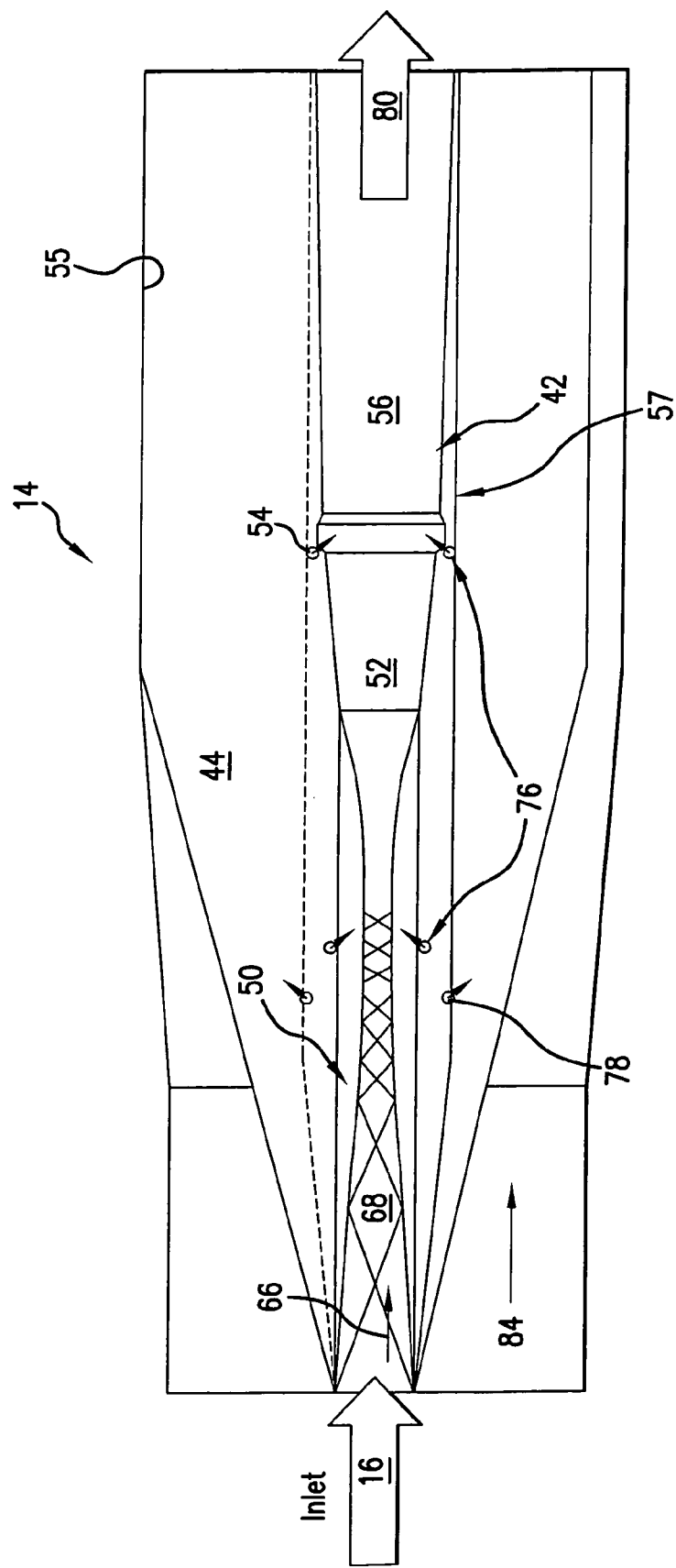
FIG. 8 illustrates a centerbody pilot pod installed in a scramjet module in accordance with a second embodiment of the invention.

In accordance with a second embodiment of the invention, FIG. 8 illustrates a main isolator 14 for a scramjet having an axisymmetric cross-sectional profile. A centerbody pilot pod 42 is mounted with axial symmetry along a center line axis of the scramjet. The centerbody pilot pod 42 includes a pilot isolator 50, pilot diffuser 52, pilot flameholder 54 and pilot combustor 56 and is essentially a dual mode ramjet (DMRJ) symmetrically disposed within the scramjet main isolator 14. In operation, the pilot receives pilot portion air 66 from the scramjet intake 16. The pilot portion air 66 is slowed in pilot isolator 50 by shock train 68 and further slowed in the pilot diffuser 52. Pilot fuel injectors 76 add fuel to the pilot portion air stream which is ignited by the pilot flameholder 54 and burned in the pilot combustor 56. The hot exhaust 80 exits the pilot pod to ignite the fuel and air mixture flowing around the centerbody pilot pod 42. The centerbody pilot pod 42 is supported by a plurality of struts 44 that extend from an interior bore wall 55 of the scramjet isolator 14 to an outer surface 57 of the centerbody pilot pod 42.

A supersonic stream of air captured by scramjet intake 16 is divided into pilot portion air 66 and main air 84. The pilot portion air 66 travels through pilot isolator 50 as discussed above, while the main air 84 travels around the pilot pod 42 and struts 44 and through the duct of the main isolator 14 that is defined by outer bore of the main isolator and the centerbody pilot pod 42. Typically, the pilot portion air 66 will constitute about 3% to 10%, by volume, of the total airflow. Pilot fuel injectors 76 introduce a suitable fuel, such as JP-7 or hydrogen, into the pilot. Main fuel injectors 78 inject fuel into the main air 84 stream. The fuel injector array has pilot circuits disposed within the pilot duct and main injectors disposed in the outer duct as shown in more detail in FIG. 11.

Figure 9:
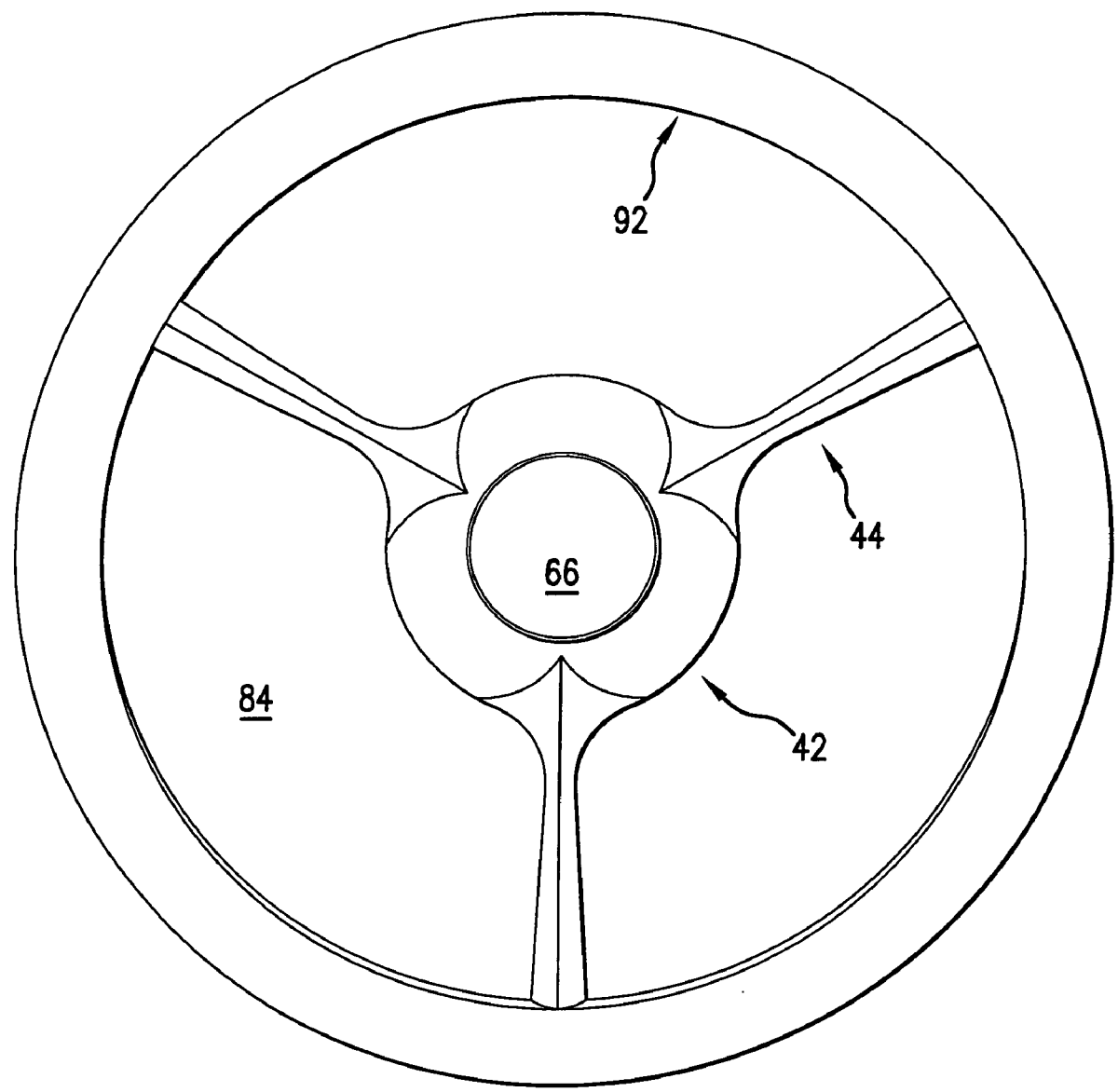
FIG. 9 illustrates a frontal view of the scramjet of FIG. 8.

FIG. 9 is a frontal view of a centerbody pilot pod 42 viewed from the scramjet intake looking back towards the entrance to the main combustor. A number of struts 44, typically three, extend from outer bore wall 92 of the main isolator to the centerbody pilot pod 42. The cross-sectional area of the combination of struts and centerbody pilot pod is small relative to the cross-sectional area of the scramjet isolator minimizing pilot drag and facilitating inlet starting. The primary ducts for the main air 84 occupy about 96%, by area referenced to the inlet throat, of the scramjet bore and the central portion occupies about another 10%, by area. The duct for the pilot air portion 66 has a flow area of about 4%. This results in an open area portion of at least 100% relative to the inlet throat area. The outer bore wall 92 of the main isolator duct diverges to accommodate the net blockage of the centerbody pilot pod 42 and the struts 44.

Figure 1:
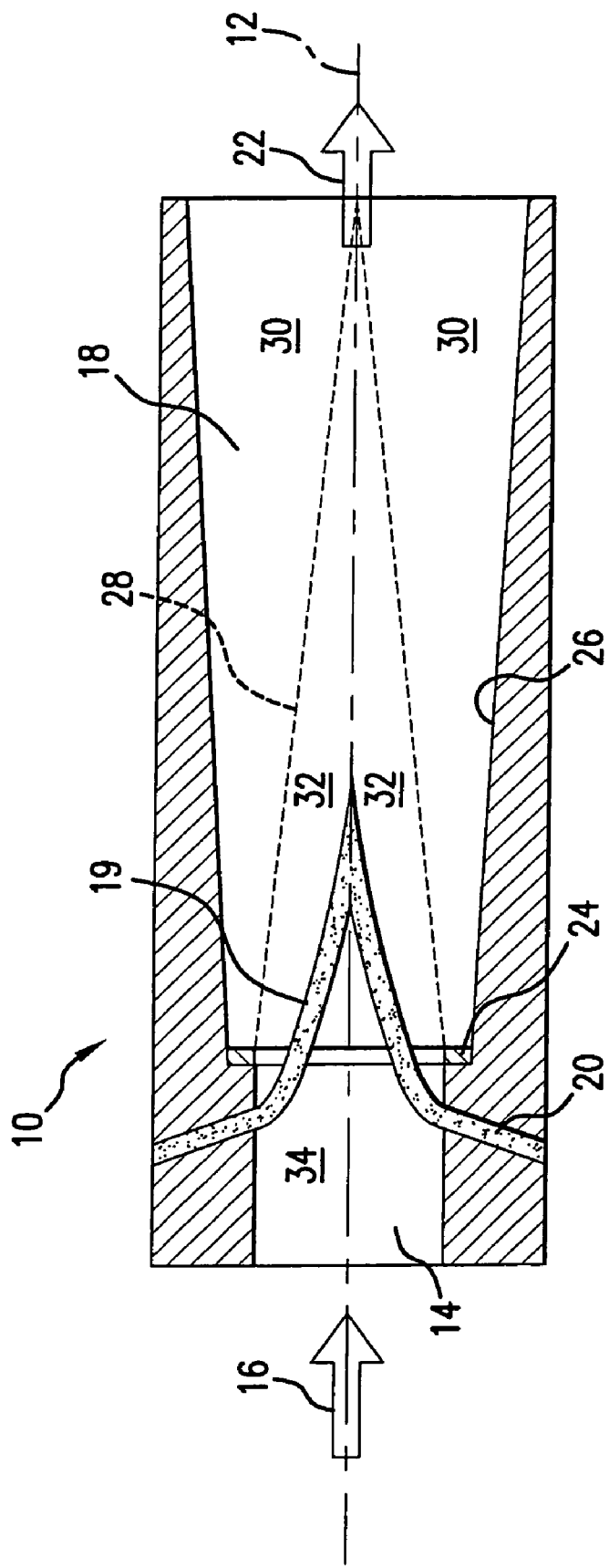
FIG. 1 illustrates a 2-D scramjet as known from the prior art and a thermal profile for that scramjet.
Figure 10:
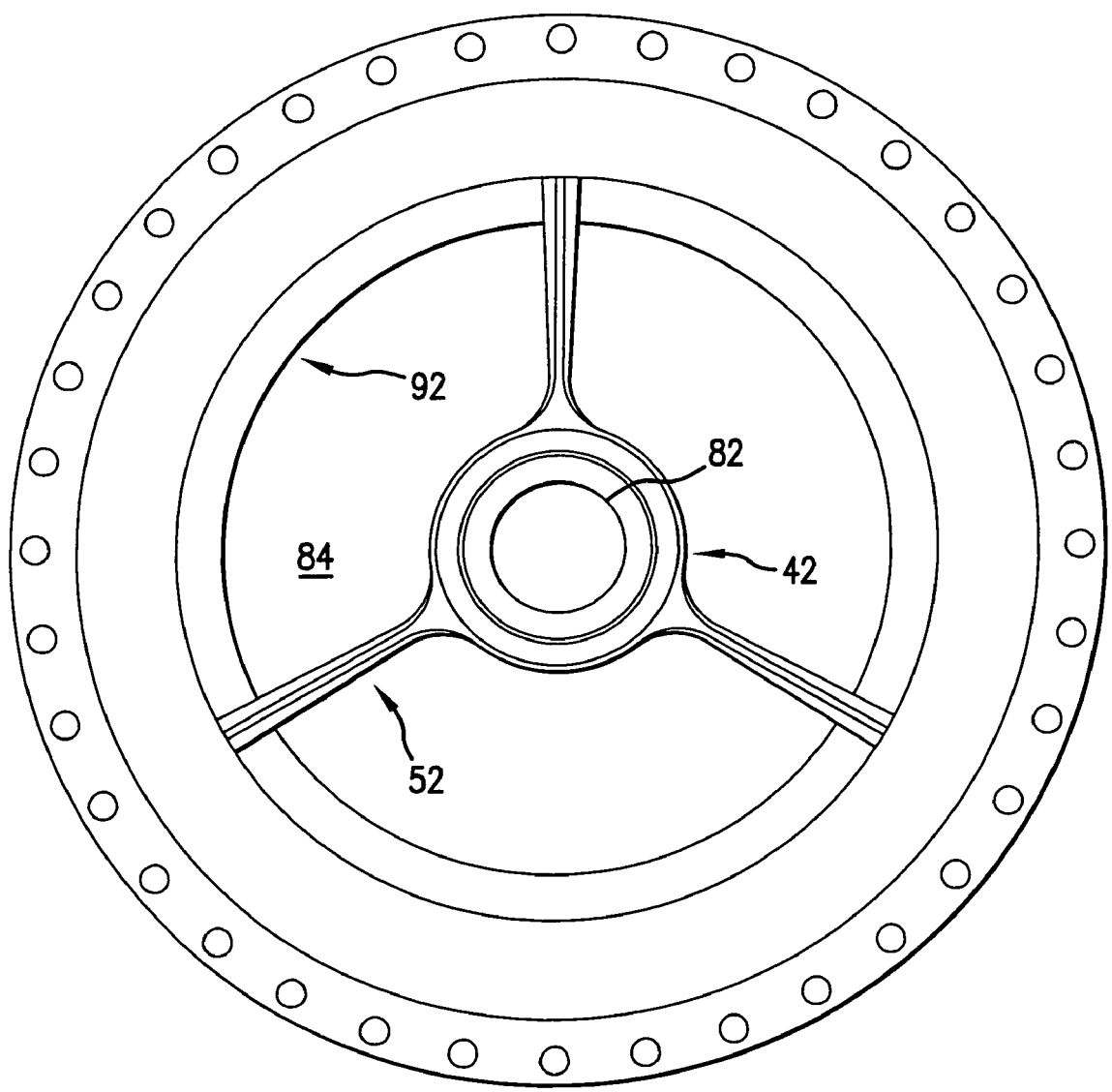
FIG. 10 illustrates a rear view of the scramjet of FIG. 8.

FIG. 10 is a rearview, as viewed from the main combustor 22 looking forward to the scramjet intake of the centerbody pilot pod 42. The hot exhaust exiting from the pilot nozzle 82 continuously ignites fresh reactants passing around it. Flame stability is greatly enhanced by first combusting the pilot air and fuel within pilot combustor 56 (FIG. 7) before ignition of the main flow. This is due to the more favorable combustion environment generated within the centerbody pilot pod 42 than is practical in the main air 84 flow path. This is because combustion in a high speed system is enhanced by slowing it to subsonic speeds and raising the pressure. Forcing the entire main airstream to subsonic speed would cause unacceptable losses in performance. The centerbody pilot pod 42 of the invention does this only for a small fraction of the flow (3%-10%, by volume) in order to burn just enough air and fuel to insure the main flow is ignited while maintaining supersonic through flow for the remaining 90%-97%. If the pilot were located in the main flow, it would be in a less favorable combustion environment and require a larger, higher drag, pilot structure, such as the prior art annular pilot (24 in FIG. 1).

Figure 11:
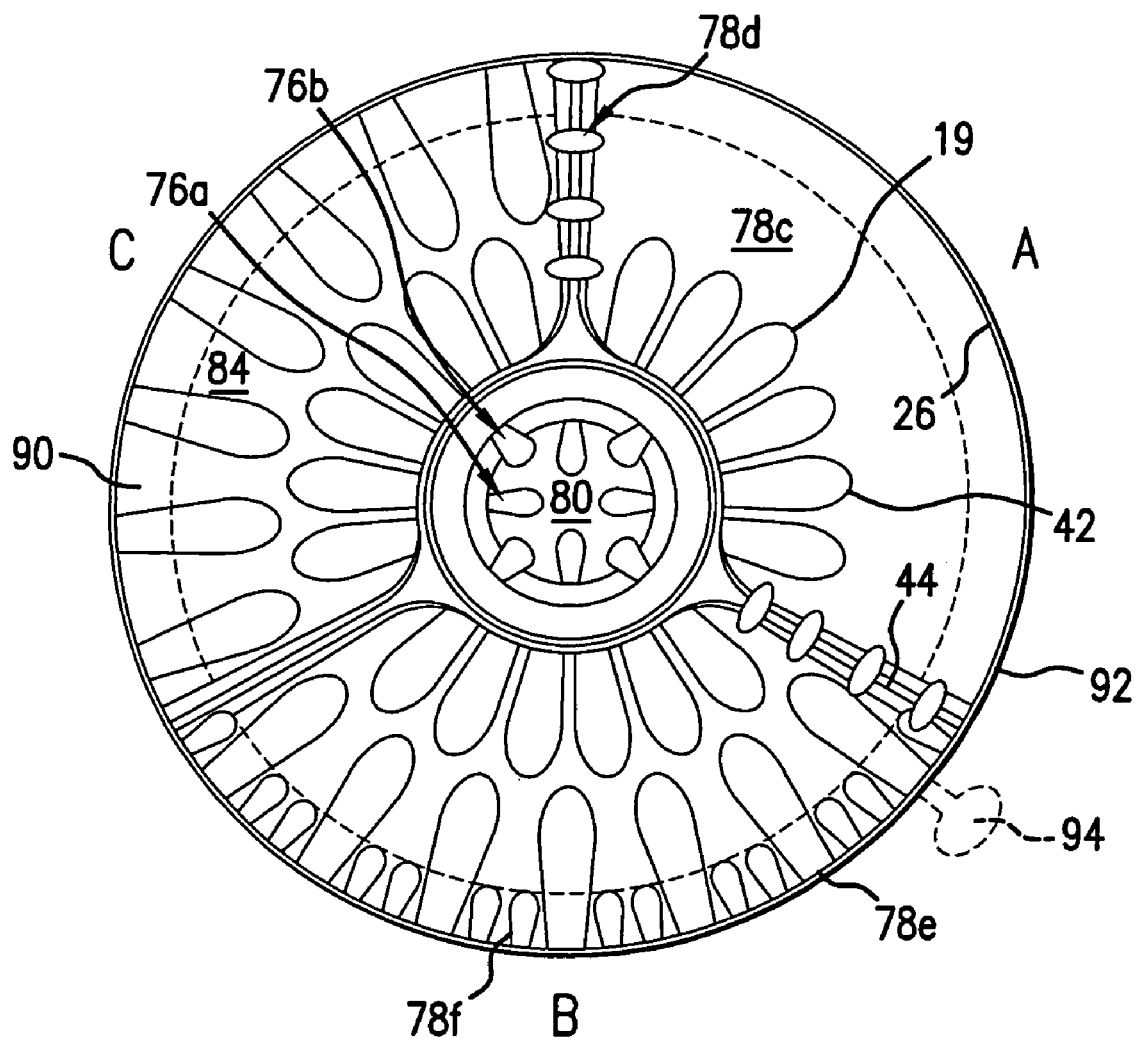
FIG. 11 is a rear view of the scramjet module of FIG. 8 illustrating fuel injection for three mission segments.

FIG. 11 is a rear view of the main isolator 14 showing an injection of fuel 19 into the main air 84 flow. Three operating conditions effective for different segments of a mission are illustrated in FIG. 11. It should be recognized that in practice, a single fuel injection operating condition is applied to the entire main isolator 14 during a mission segment. The fuel plumes 19 may be injected through apertures formed in an exterior wall of the centerbody pilot pod 42, bases of struts 44, and cascade injectors 94 formed in outer bore wall 92 (One typical injector is illustrated for clarity). For operation across a wide range of speed, with widely ranging inflow and fuel conditions, zoned injection is preferred to optimize engine performance.

Segment A illustrates fuel injection for lowest speed, during ramjet takeover (the lowest speed where the ramjet mode can accelerate the vehicle). Pilot fuel injectors 76a and 76b are functioning at all speeds to maintain the piloting of the main combustion. Main fuel injectors 78c inject radially outward from the centerbody pilot pod 42 and main fuel injectors 78d inject axially from the strut 44 bases. The main air/fuel mix is ignited by the central pilot exhaust 80. This configuration delays the combustion so that the combustion back pressure does not exceed the inlet tolerance and unstart the inlet.

As shown at Segment B, at higher speeds, low speed injectors 78d are turned off and main fuel injectors 78e and 78f that inject fuel radially inward from the outer bore wall 92 are turned on. This zone provides maximum acceleration prior to reaching the cruise condition. For maximum efficiency during acceleration, the engine fuel flow is typically in excess of the stoichiometric value, or 5%-10% rich.

As shown at Segment C, when the desired cruise speed is reached, the engine thrust is decreased to sustain the desired speed. In order to reduce the thrust, the fuel flow is reduced to a lean condition which is accomplished by turning off injectors 78f which are designed to only fuel the outer region 90 of the main air 84 flow.

Figure 12:
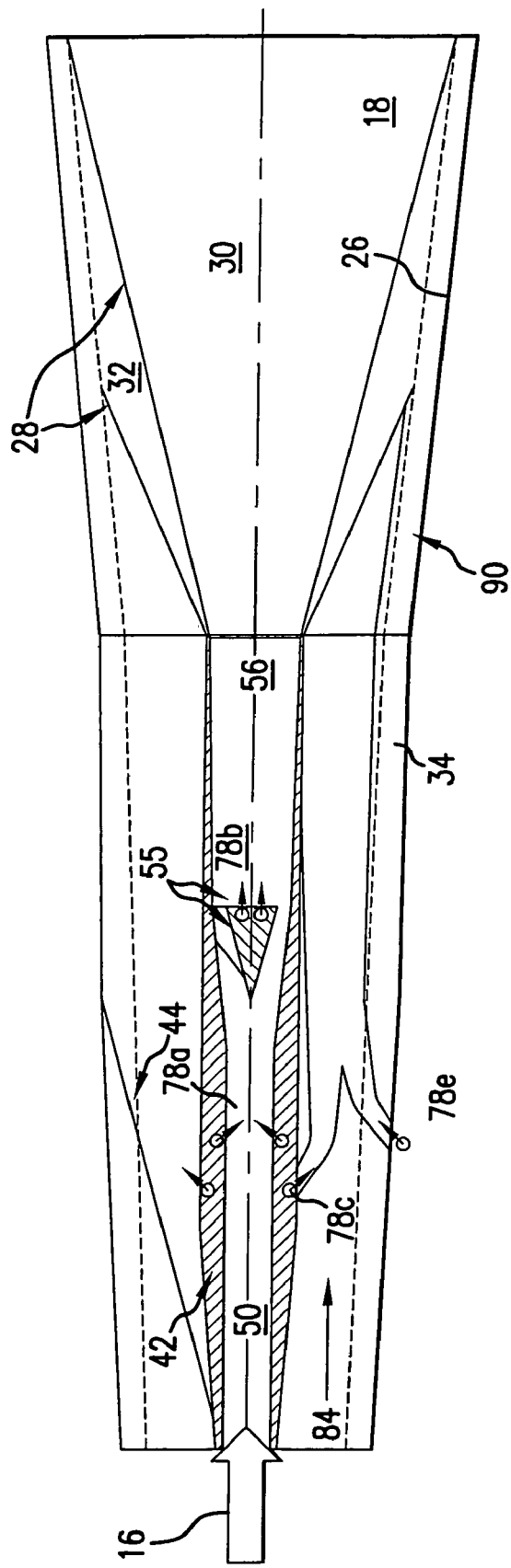
FIG. 12 illustrates a thermal profile for the scramjet module of FIG. 8.

FIG. 12 is the same view as FIG. 8 showing a variation on the internal piloting function. In ramjet and scramjet technology, the pilot function depends on three primary conditions. These are the temperature, the pressure and the residence time in the pilot zone. In practical systems, the size of the pilot zone determines (in combination with other factors) the residence time. If a different size vehicle or mission is selected a relatively larger pilot zone may be needed. In FIG. 8, the pilot zone was defined by an annular cavity pilot 54 at the end of the pilot diffuser 52. In order to illustrate a larger pilot zone, we show a conical base pilot 55 in FIG. 12. This variant would be used for lower ramjet takeover speeds, smaller vehicles or higher cruise altitudes.

An advantage of the invention is also illustrated in FIG. 12. When the scramjet is in high speed cruise mode, utilizing lean fueling, isotherm lines 28 illustrate how the hottest region 30 is isolated from the main combustor walls 26 reducing combustor thermal loading. Main fuel injectors 78 inject fuel into the main air 84 flow external to the centerbody pilot pod 42. The air/fuel mix is ignited in main combustor 18 by the heat of combustion exiting pilot combustor 56. With core burning, the pilot zone and the initiation of the combustion hottest region 30 is remote from the main combustor wall 26. As the flame front travels from the center of the main combustor 18 towards the main combustor wall 26, the mixture is rapidly raised in temperature according to the amount of fuel mixed with the air. As the flame front crosses the gap and approaches the main combustor wall 26, it encounters the lean outer annulus region 90 with little or no fuel contained therein. This lean air can not burn, so the main combustor wall 26 never sees the full heat flux as in a prior art scramjet. The heat load, which is the heat each pound of fuel must absorb, is the integral of the combustor heat flux (equivalent to heat transfer per unit of area). With a shorter combustor length due to instream injection and a lower heat flux, the heat load is significantly lower with core burning than possible with prior art scramjets.

One or more embodiments of the present invention have been described. Nevertheless, it will be understood that various modifications may be made without departing from the spirit and scope of the invention. Accordingly, other embodiments are within the scope of the following claims.

What is claimed is:

1. A centerbody pilot pod for a scramjet engine, where said scramjet engine has, in sequence and in fluid communication an air intake that is effective to divide a supersonic stream of air into a pilot air portion and a main air portion, a main isolator and a main combustor, said centerbody pilot pod comprising:

a pilot isolator effective to receive said pilot air portion, which is from 3% to 10%, by volume, of said supersonic stream and to reduce said pilot air portion to subsonic, said pilot isolator disposed between said air intake and a pilot diffuser;

said pilot diffuser disposed between said pilot isolator and a pilot flameholder;

said pilot flameholder disposed between said pilot diffuser and a pilot combustor;

wherein said centerbody pilot pod is disposed in axis symmetry along a central axis of said main isolator and supported by a plurality of struts extending from an inner wall of said main isolator to an outer surface of said centerbody pilot pod such that the exhaust from said pilot combustor is confined to said main combustor center and said main air portion travels around said centerbody pilot pod.

2. The centerbody pilot pod of claim 1 wherein said plurality of struts include pilot fuel injectors effective to deliver fuel to said pilot isolator and to said pilot flameholder.

3. The centerbody pilot pod of claim 2 wherein main fuel injectors are located on said inner wall of said main isolator and on an outer surface of said pilot pod.

4. The centerbody pilot pod of claim 2 wherein a combination of said plurality of struts and said pilot pod occupy less than 20% of a cross sectional area of said main isolator.

5. The centerbody pilot pod of claim 2 wherein a nozzle affixed to said pilot combustor is effective to deliver exhaust from said pilot combustor to said main combustor.

6. The centerbody pilot pod of claim 5 wherein main fuel injectors located on said inner wall of said main isolator are in a no-flow position while a remainder of said main fuel injectors are in a provide flow position.

7. The centerbody pilot pod further including main fuel injectors along bases of said struts.

* * * * *

UNITED STATES PATENT AND TRADEMARK OFFICE
CERTIFICATE OF CORRECTION

| | | |
|---|---|---|
| PATENT NO. | : 7,797,943 B2 | Page 1 of 1 |
| APPLICATION NO. | : 11/582589 | |
| DATED | : September 21, 2010 | |
| INVENTOR(S) | : Melvin J. Bulman | |

It is certified that error appears in the above-identified patent and that said Letters Patent is hereby corrected as shown below:

Please correct Claim 7 at Column 8, lines 28-29 of the issued patent to read:

7. The centerbody pilot pod of claim 6 further including main fuel injectors along bases of said struts.

Signed and Sealed this
Eleventh Day of January, 2011

David J. Kappos
*Director of the United States Patent and Trademark Office*